(12) United States Patent
Hsu

(10) Patent No.: US 11,185,941 B2
(45) Date of Patent: Nov. 30, 2021

(54) WELDING-TYPE DEVICES HAVING CONFIGURABLE INTERFACES

(71) Applicant: Illinois Tool Works Inc., Glenview, IL (US)

(72) Inventor: Christopher Hsu, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 548 days.

(21) Appl. No.: 15/448,056

(22) Filed: Mar. 2, 2017

(65) Prior Publication Data

US 2018/0250764 A1 Sep. 6, 2018

(51) Int. Cl.
*B23K 9/10* (2006.01)
*B23K 9/095* (2006.01)

(52) U.S. Cl.
CPC .......... *B23K 9/1006* (2013.01); *B23K 9/0953* (2013.01); *B23K 9/1062* (2013.01); *B23K 9/1087* (2013.01)

(58) Field of Classification Search
CPC ........ B23K 9/095; B23K 9/0953; B23K 9/10; B23K 9/1006; B23K 9/1062; B23K 9/1087
USPC ......................................................... 219/132
See application file for complete search history.

(56) References Cited

U.S. PATENT DOCUMENTS

| 6,624,388 | B1* | 9/2003 | Blankenship | ........ B23K 9/1062 |
| | | | | 219/130.5 |
| 6,912,447 | B2 | 6/2005 | Klimko et al. | |
| 7,208,697 | B2 | 4/2007 | Blankenship et al. | |
| 7,294,808 | B2 | 11/2007 | Furman et al. | |
| 9,128,472 | B2 | 9/2015 | Lawson et al. | |
| 2007/0080153 | A1* | 4/2007 | Albrecht | .................. B23K 9/10 |
| | | | | 219/130.01 |
| 2007/0262065 | A1 | 11/2007 | Peters et al. | |
| 2009/0184098 | A1 | 7/2009 | Daniel et al. | |
| 2009/0313549 | A1* | 12/2009 | Casner | ................. B23K 9/0953 |
| | | | | 715/740 |
| 2011/0114616 | A1* | 5/2011 | Albrecht | ................ B23K 9/095 |
| | | | | 219/137 R |
| 2013/0075380 | A1* | 3/2013 | Albrech | ............... B23K 9/1006 |
| | | | | 219/137 R |
| 2013/0112673 | A1 | 5/2013 | Petrilla et al. | |
| 2014/0069900 | A1 | 3/2014 | Becker et al. | |
| 2014/0251969 | A1 | 9/2014 | Stoner et al. | |
| 2014/0263247 | A1 | 9/2014 | Hillen et al. | |
| 2014/0266576 | A1 | 9/2014 | Hillen et al. | |
| 2015/0069029 | A1 | 3/2015 | Daniel | |
| 2016/0311045 | A1* | 10/2016 | Sickels | .................. B23K 9/095 |

FOREIGN PATENT DOCUMENTS

WO 2013138831 9/2013

* cited by examiner

*Primary Examiner* — John J Norton
(74) *Attorney, Agent, or Firm* — McAndrews, Held & Malloy, Ltd.

(57) ABSTRACT

Welding-type devices having configurable interfaces are disclosed. An example welding-type device, includes only one user interface input device, a receiver circuit configured to receive interpretation information, and a controller configured to interpret input received via the user interface input device based on the interpretation information to modify zero or more of a plurality of welding-type variables, and to control a welding-type operation based on the plurality of welding-type variables.

15 Claims, 9 Drawing Sheets

WELDING-TYPE DEVICES HAVING CONFIGURABLE INTERFACES

BACKGROUND

This disclosure relates generally to welding and, more particularly, to welding-type devices having configurable interfaces.

The "user" of welding equipment can be generalized into two groups: 1) the operators who perform welds using the welding equipment in a production environment, and 2) welding shop work order personnel, tooling personnel, continuous improvement personnel, and/or other non-welder stakeholders of the weld operators' processes. Examples of the second group include weld engineers, service technicians, shop supervisors and quality control personnel. The needs of these two groups of users are typically different. The operators are often given a routine, and their primary tasks are to repeat a welding task and to achieve a takt time and produce a given quantity of quality parts in a given time. In many fabrication shops, some adjustability is allowed to the operators to accommodate variation in the production environment, within predetermined limits. Weld operators often prefer a simple interface on the welding equipment that permits necessary control without undue complexity.

The features of the welding equipment used by the non-operator group can be more complex than the features used by the welding operator group. Non-operators may seek to select the proper parameters to design a procedure qualification record (PQR), monitor any deviation of operator from a weld procedure specification (WPS), access all of the functionality of the welding equipment for full configuration ability, and/or calibrate the welding equipment.

SUMMARY

Welding-type devices having configurable interfaces are provided, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
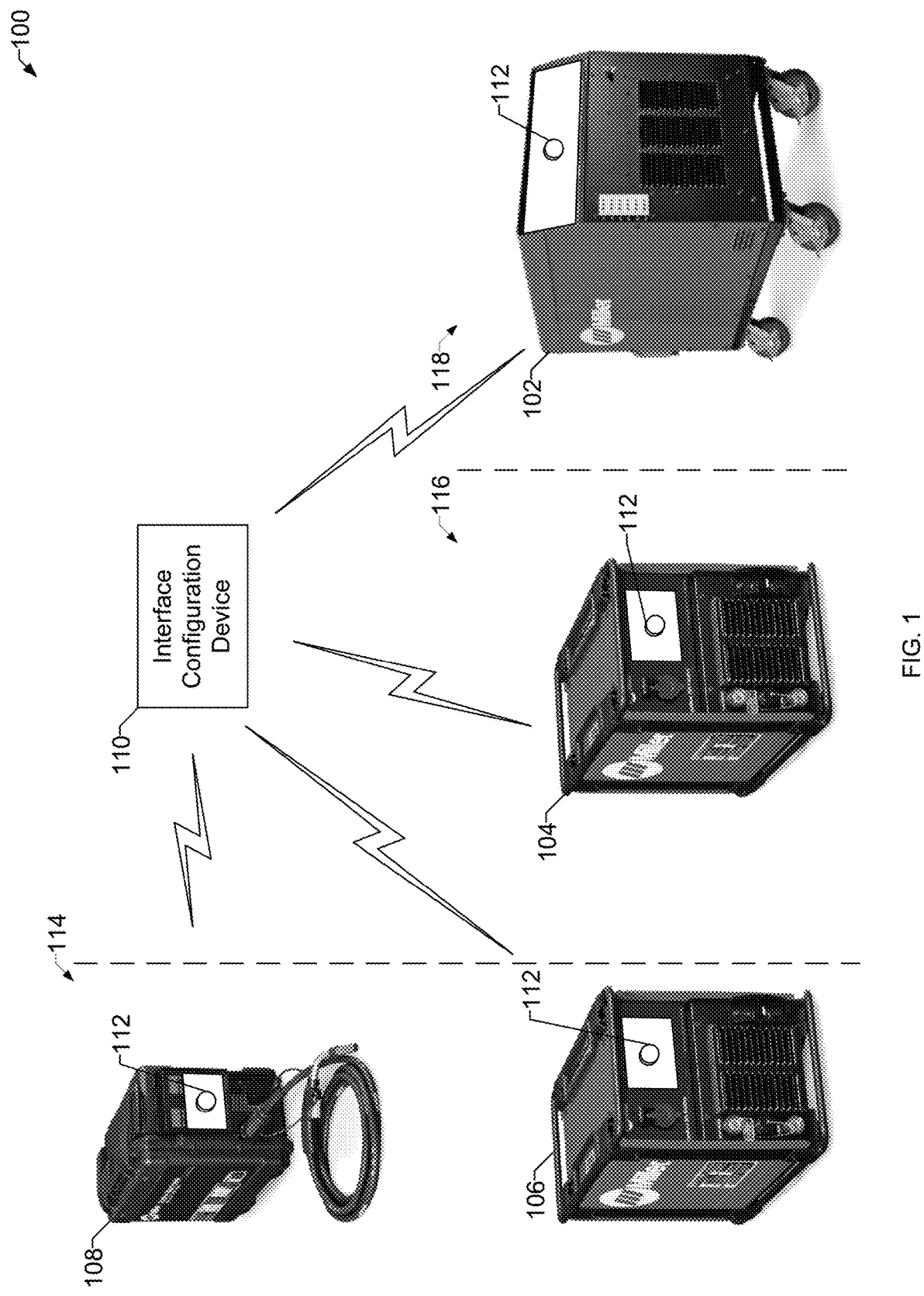
FIG. 1 illustrates an example system for configuring welding-type power supplies and accessory devices to interpret a programmable user interface device, in accordance with aspects of this disclosure.

Designers of conventional welding equipment have attempted to concurrently meet the needs of different groups of users of welding equipment simultaneously with one user interface on the welding equipment, usually by introducing a high level of complexity into the user interface. Conventional welding equipment provide a physical cover for hiding controls for advanced users from the operators, provide an expensive pendant tethered to the welding equipment for programming by a control cable and which can be removed during production, or permit a tablet computer to be used as an interface in addition to a physical interface, where the tablet computer acts in parallel with the conventional user interface.

Disclosed example welding equipment provides a simple user interface that is configurable by separate device, such as a smartphone or a tablet computer, to specify the function of one or more elements on the user interface. In some disclosed examples, the user interface of the welding equipment is a single programmable input device, such as a knob, that can be interpreted by the welding equipment to control any number of welding-related variables, or even zero variables to give the illusion of control to the weld operator.

Disclosed example welding equipment interfaces can be completely customizable by an interface configuration tool, such as an application running on a computing device. For example, the interface could be a programmable user interface device (e.g., a knob with an encoder), one or more nonprogrammable user interface devices, and/or a simple display (e.g. LCD or 7-segment LED display). The behavior of the programmable user interface device and/or the LCD are entirely configurable by the interface configuration tool. The behavior of the programmable component(s) could be similar or identical to a conventional machine (e.g., controlling WFS and voltage for a GMAW welding power supply). The welding equipment may connect with an interface configuration tool wirelessly, such as via an NFC tap, followed by using WiFi, MiFi, Bluetooth®, or other wireless protocols, to communicate data between the welding equipment and the interface configuration tool.

Disclosed examples permit use of devices having more user-friendly interfaces for implementing complex configuration tasks, such as touchscreens or keyboard/mouse combinations, and simple transfer of the complex configuration tasks to the welding-type device where a simple interface can be used. Additionally or alternatively, the weld engineer may upload data from the welding-type device to the interface configuration device for subsequent weld data analysis, tracking, trending, diagnostics, preventative maintenance, code compliance, production tracking, weld operator efficiency data, and/or any other information.

As used herein, the term "welding-type device" refers to any device capable of supplying and/or utilizing power suitable for welding, plasma cutting, induction heating, CAC-A and/or hot wire welding/preheating (including laser welding and laser cladding), including inverters, converters, choppers, resonant power supplies, quasi-resonant power supplies, as well as control circuitry and other ancillary circuitry associated therewith, wire feeders, robot interfaces, gas supplies, user interface, and/or other devices, accessories, and/or peripherals that implement or work with a welding-type system. As used herein, the term "welding-type operation" includes welding, plasma cutting, induction heating, CAC-A, brazing, and/or hot wire welding/preheating (including laser welding and laser cladding).

As used herein, the term "programmable" refers to capable of being configured without requiring changes to hardware, firmware, or devices drivers. Examples of programmable devices include components capable of direct or indirect configuration and re-configuration using metadata and/or markup languages. As used herein, the term "nonprogrammable" refers to not being programmable as defined above. Examples of nonprogrammable components include components that are permanently configured to have one or more particular functions and/or components that are only configurable using firmware or device drivers.

Disclosed example welding-type devices include only one user interface input device, a receiver circuit configured to receive interpretation information, and a controller configured to interpret input received via the user interface input device based on the interpretation information to modify zero or more of a plurality of welding-type variables, and to control a welding-type operation based on the plurality of welding-type variables.

Some example welding-type devices further include an output device, in which the controller outputs information via the output device to provide a visual response to the input received via the user interface input device. In some such examples, the output device includes a display device. In some examples, the controller interprets the input received via the user interface input device based on the interpretation information to modify a first one of the welding-type variables, and modifies a second one of the welding-type variables based on the first one of the welding-type variables.

In some examples, the controller interprets the input received via the user interface input device to simultaneously modify two or more of the welding-type variables based on the interpretation information. In some example welding-type devices the interpretation information includes at least one of a weld voltage or a wire feed speed, and the controller controls a power converter for a gas metal arc welding (GMAW) welding process.

In some examples, the receiver circuit receives the interpretation information via a wireless communication. In some examples, the receiver circuit receives configuration information, and the controller controls the welding-type variables based on the configuration information. In some such examples, the configuration information specifies control information for at least one of the welding-type variables that is not controlled by the user interface input device as specified by the interpretation information. In some examples, the controller applies a limit specified in the configuration information to at least one of the welding-type variables that is controlled by the user interface input device based the interpretation information.

Some disclosed welding-type devices include only one configurable user interface input device, one or more nonconfigurable user interface input devices, a receiver circuit configured to receive interpretation information for the configurable user interface input device, and a controller. The controller interprets first input received via the configurable user interface input device based the interpretation information to modify zero or more of a plurality of welding-type variables, interprets second input received via the one or more nonconfigurable user interface input devices to modify predetermined one or more of the plurality of welding-type variables, and controls output of welding-type power based on the plurality of welding-type variables.

Some examples further include an output device, in which the controller outputs information via the output device to provide a visual response to the first input received via the configurable user interface input device. In some such examples, the output device includes a display device. In some examples, the controller outputs, via the output device and based on the interpretation information, a value of one of the welding-type variables that is controlled by the configurable user interface input device.

In some examples, the controller interprets the first input received via the configurable user interface input device based on the interpretation information to modify a first one of the welding-type variables, and modifies a second one of the welding-type variables based on the first one of the welding-type variables. In some examples, the controller interprets the first input received via the configurable user interface input device to simultaneously modify two or more of the welding-type variables based on the interpretation information. In some examples, the receiver circuit receives the interpretation information via a wireless communication.

In some example welding-type devices, the receiver circuit receives configuration information, and the controller controls the welding-type variables based on the configuration information. In some such examples, the configuration information specifies control information for at least one of the welding-type variables that is not controlled by the configurable user interface input device as specified by the interpretation information and is not controlled by the one or more nonconfigurable user interface input devices. In some examples, the controller is configured to apply a limit specified in the configuration information to at least one of the welding-type variables that is controlled by the configurable user interface input device based the interpretation information.

FIG. 1 illustrates an example system 100 including multiple welding-type power supplies 102, 104, 106 and a welding accessory device 108, and an interface configuration device 110 for configuring the welding-type power supplies 102-106 and/or the welding accessory device 108 to interpret a programmable user interface device.

As shown in FIG. 1, each of the example welding-type power supplies 102-106 and/or the welding accessory device 108 is provided with a single programmable user input 112, such as a programmable knob. As disclosed herein, any of the welding-type power supplies 102-106 and/or the welding accessory device 108 (generally referred to as welding-type devices) may include one or more nonprogrammable (e.g., feature-dedicated) input devices and/or one or more programmable and/or non-programmable output devices, such as display devices and/or other indicators. Example display devices may include liquid crystal displays (LCDs), seven-segment light emitting diodes (LEDs), organic LED (OLED) displays, and/or display devices using any other display technologies.

The example welding-type power supply 102 may be located in a same weld cell 114 as the welding accessory device 108. The example welding-type power supply 104 and the welding-type power supply are located in a different weld cells 116, 118. In the example of FIG. 1, the work cells 114-118 may be located in a same building or otherwise in a same vicinity controlled by the same managerial personnel.

In an example, a weld engineer or other production control personnel in a fabrication shop programs specific weld programs for certain jobs in each weld cell 114-118 (e.g., for a work shift or a batch of production) using the interface configuration device 110 (e.g., a mobile device). For instance, on a given day, only 3 weld programs for multiple machines may be needed in order for production. The weld engineer uses the interface configuration device 110 to configure the 3 weld programs, and then uses wireless communications to transmit the program to each machine to be used (e.g., broadcast to devices within a WiFi network and/or physical approach one or more devices and initiate near field communications (NFC) or other close-proximity communications). In the illustrated example, there are different types (e.g., models) of welding-type devices. The interface configuration device formats interpretation information and/or configuration information differently for each of the different types of the welding-type devices. The weld operator then sees the configured interface for the applicable job(s) on that day, which may reduce the likelihood of confusion on the part of the weld operator and enable the weld operator to begin executing shop orders.

In some examples, the interface configuration device 110 (e.g., the tablet, smartphone or mobile computing device) may execute an app or other software that connects to a network server (e.g., a web service), and/or accesses one or more physical media, to access a WPS database of approved or released welding recipes to easily configure the function and behavior of the programmable user input device 112 (e.g., the "knob") physically located on the welding equipment hardware. Once downloaded to the interface configuration device 110, the welding recipe and its corresponding interpretation information and/or configuration information may be formatted and provided to the welding-type devices 102-108 with little or no additional customization by the user of the interface configuration device 110.

Figure 2A:
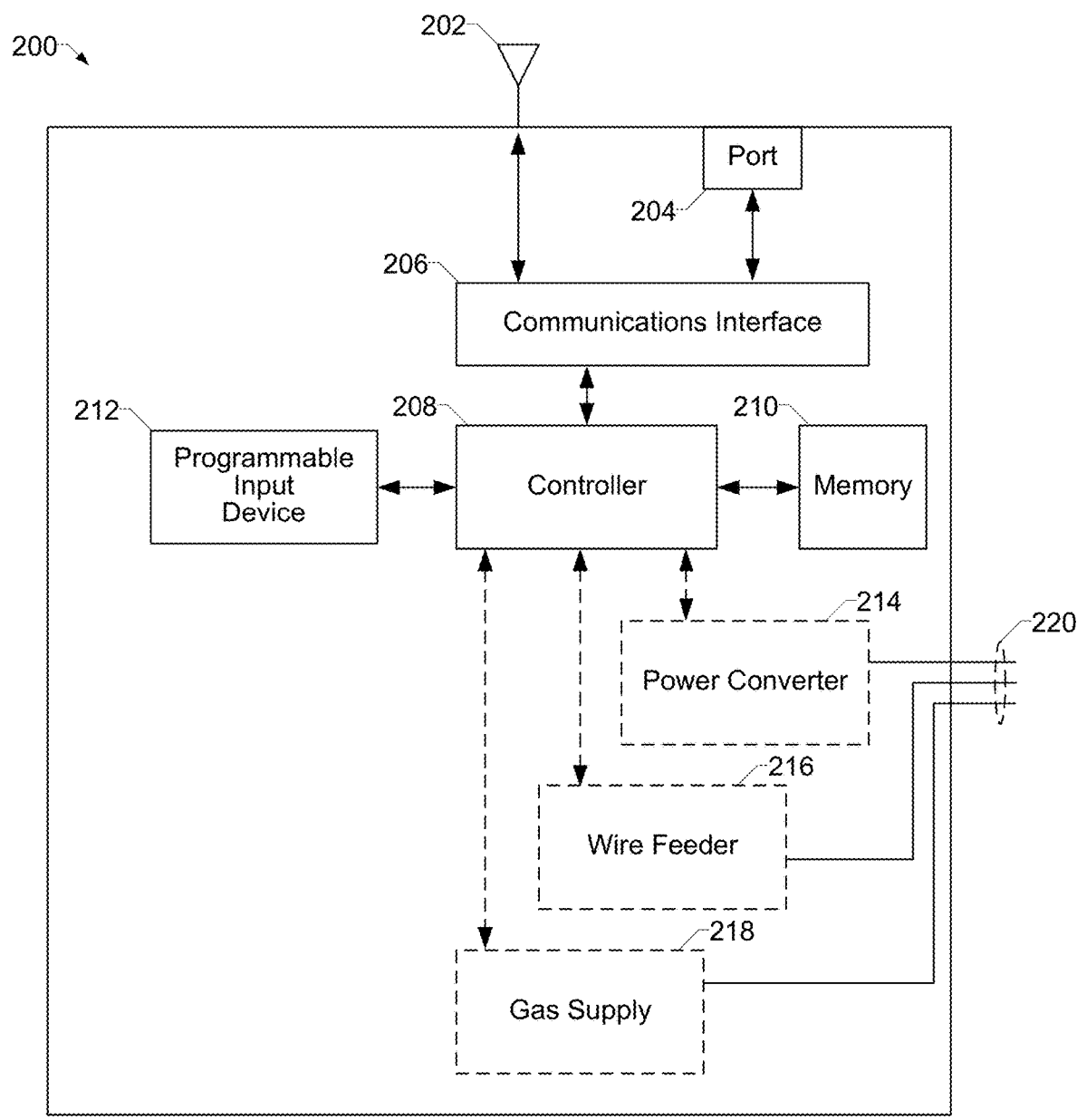
FIG. 2A illustrates an example welding-type device including a single programmable input device, in accordance with aspects of this disclosure.

FIG. 2A illustrates an example welding-type device 200 including a single programmable input device. The welding-type device 200 may implement any of the welding-type power supplies 102-106 and/or the welding accessory device 108 of FIG. 1. The example welding-type device 200 of FIG. 2A includes an antenna 202, a communication port 204, a communication interface 206, a controller 208, memory 210, and a programmable input device 212.

The antenna 202 may be any type of antenna suited for the frequencies, power levels, etc. used for radio frequency (RF) wireless communications (e.g., Wi-Fi, WiFi hotspot or MiFi, Bluetooth, Bluetooth Low Energy, Zigbee, NFC, cellular network, PAN/WPAN, BAN and/or the like) between the welding-type device 200 and other devices such as wireless access point (WAP), welding equipment, wireless base stations, phones, computers, etc.

Communication port 204 may comprise, for example, an Ethernet port, a USB port, an HDMI port, a fiber-optic communications port, a FireWire port, a field bus port, a fiber optics port, a serial communications port, an Ethernet for Control Automation Technology (EtherCAT) port, and/or any other suitable port for interfacing with a wired or optical cable via which the welding-type device 200 may communicate with other devices such as welding equipment, wireless base stations, phones, computers, etc.

The communication interface 206 interfaces the controller 208 to the antenna 202 and/or the port 204 for transmit and receive operations. For transmit operations, the communication interface 206 receives data from controller 208, packetizes the data, and converts the data to physical layer signals in accordance with protocols in use by the communication interface 206. The data to be transmitted may comprise, for example, information about the welding-type device 200 to enable the interface configuration device 110 to provide appropriate interpretation information. For receive operations, communication interface 206 receives physical layer signals via the antenna 202 and/or the port 204, recovers data from the received physical layer signals (demodulate, decode, etc.), and provides the data to the controller 208. The received data may comprise, for example, interpretation information for use by the controller 208 to control zero or more welding-related variables in response to input from the programmable input device 212 (e.g., preset programs, voltage, amperage, wire speed settings and/or measurements, power, heat input, and/or logic state in weld process control state machine).

The controller 208 executes machine readable instructions which may be stored locally (e.g., in a cache) and/or in the memory 210. The memory 210 may be a volatile or non-volatile memory.

The programmable input device 212 is a single programmable input device. The programmable input device 212 may be, for example, a knob, a push button or set of multiple corresponding push buttons, dial, microphone, toggle switch, slider, control element widget in a graphical user interface or multi-touch screen (e.g., dial, scroll bar, drop down list, button, menu, spinner, etc.) and/or any other type of analog or digital user input device. In some examples, the programmable input device 212 is marked to enable the user to determine a position or value of the programmable input device 212, such as using a gradation decal and an angular position indicator line for a knob.

The controller 208 uses interpretation information received via the communication interface 206 to modify zero or more welding-type variables that are controllable in the welding-type device 200. For example, GMAW-capable welding power supplies may have controllable variables that include output voltage, wire feed speed, wire preheating, output inductance, and/or transfer mode (e.g., spray, short circuit, etc.). SMAW-capable welding power supplies may have controllable variables that include output current and/or hot start current. For example, the welding-type device 200 may include a power converter 214, a wire feeder 216, and/or a gas supply 218. The power converter 214 converts input power (e.g., mains power, generator power, etc.) to welding-type power and outputs the welding-type power via a welding cable 220. The wire feeder 216 feeds electrode wire from a wire supply to a welding torch via the welding cable 220. The gas supply 218 controls the flow of welding gas to a welding torch via the welding cable 220.

The controller 208 controls the power converter 214 (e.g., controlling the output voltage, output current, etc.), controls the wire feeder 216 (e.g., controlling the wire feed speed), controls the gas supply 218 (e.g., controlling the gas flow rate), and/or controls any other welding-related variables, based on the interpretation information received via the communication interface 206. In some examples, the interpretation information may specify that the controller 208 does not directly control one, multiple, or all of the controllable variables. The interpretation information may specify one or more relationships that may be used to simultaneously control multiple variables using the single programmable input device 212.

In some examples, the interpretation information may specify that turning a user interface knob implementing the single programmable input device 212 may control multiple variables such as welding voltage and wire feed speed for a GMAW process, such that turning the user interface knob modifies both the welding voltage and the wire feed speed in accordance with a relationship. The relationship may be predetermined and/or specified in the interpretation information.

The communication interface 206 also receives configuration information. The controller 208 uses the configuration information to control welding-type variables. For example, the configuration information may specify values for one or more variables that are not specified for control by the programmable input device 212 in the interpretation information. For example, a weld supervisor may elect to program the welding-type device 200 to not permit a welder using the welding-type device 200 to control specific controllable variables, opting instead to set values or algorithms (e.g., other variables that control the value of a subject variable) for those controllable variables. Additionally or alternatively, the configuration information may apply limits or ranges to variable(s) that are specified for user control via the programmable input device 212.

Figure 2B:
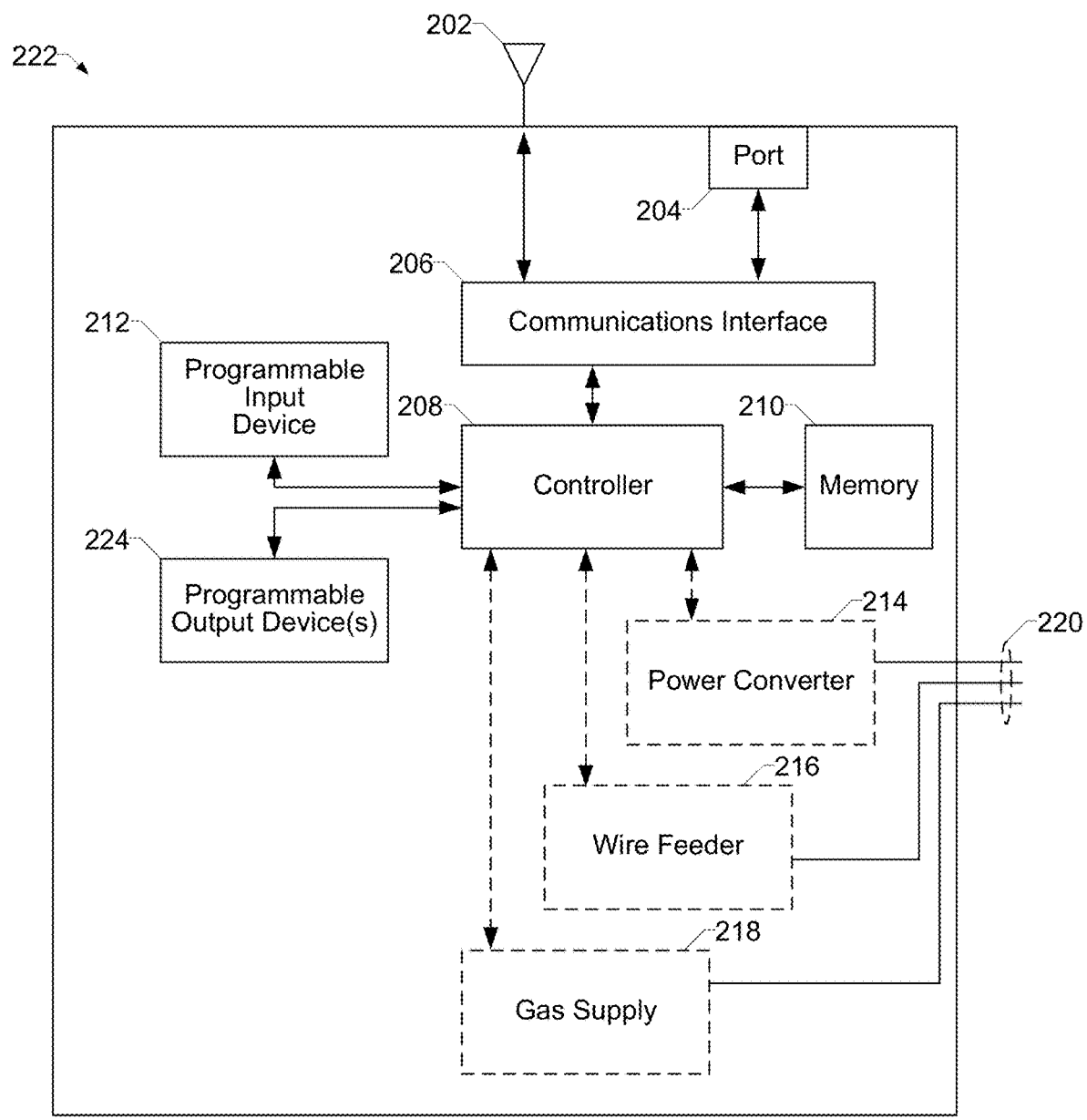
FIG. 2B illustrates an example welding-type device including a single programmable input device and one or more programmable output devices, in accordance with aspects of this disclosure.

FIG. 2B illustrates another example welding-type device 222 including the single programmable input device 212 of FIG. 2A and one or more programmable output devices 224. Example programmable output devices 224 may include, for example display devices. The controller 208 of FIG. 2B may control the programmable output device(s) to output information based on the interpretation information. In some examples, the programmable output device(s) 224 indicate a variable that is controllable by the programmable input device 212 and/or a currently-selected value of the user-controlled variable.

Figure 2C:
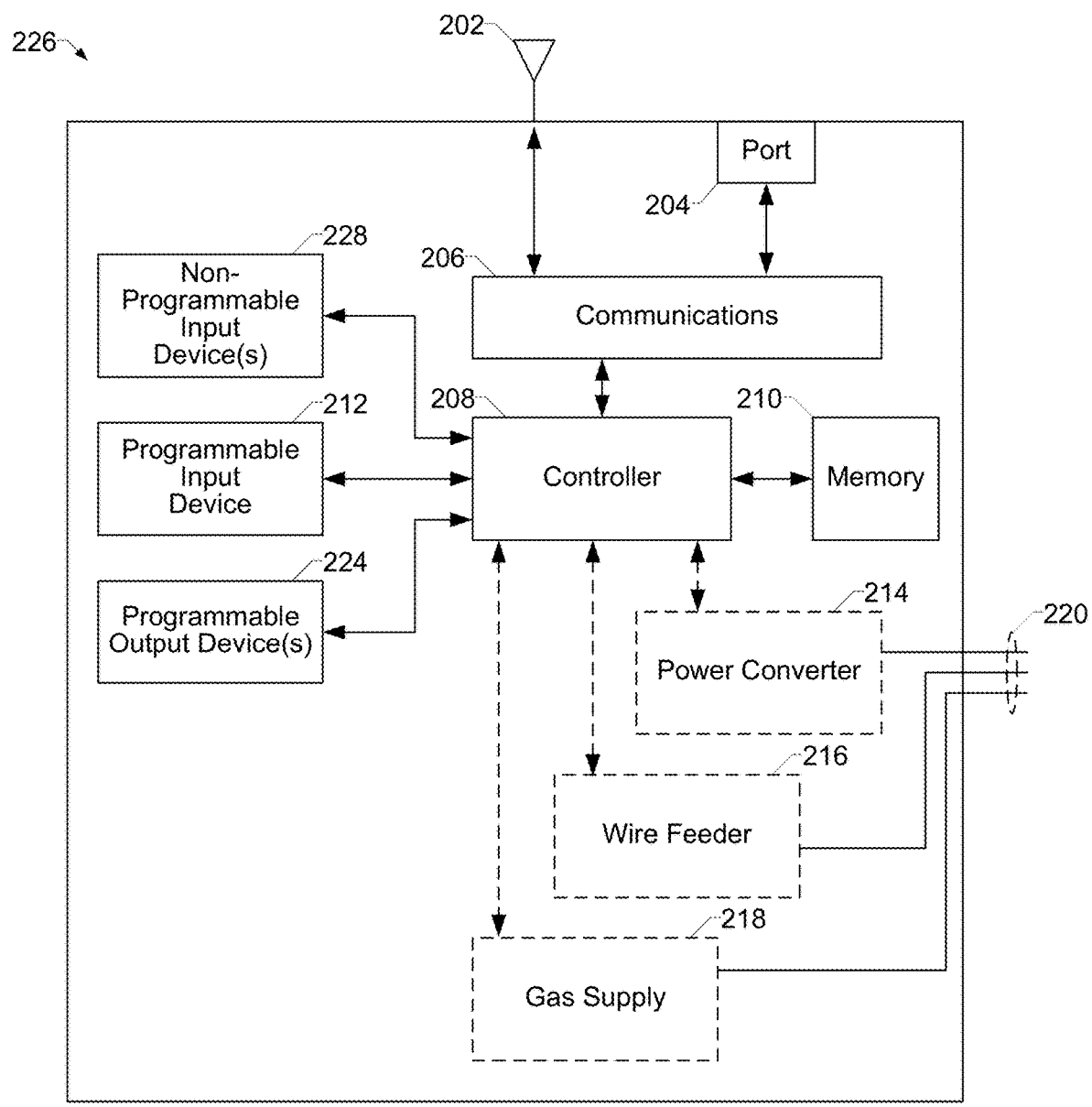
FIG. 2C illustrates an example welding-type device including a single programmable input device and one or more nonprogrammable input devices, in accordance with aspects of this disclosure.

FIG. 2C illustrates another example welding-type device 226 including the single programmable input device 212 and one or more nonprogrammable input devices 228. The nonprogrammable input devices 228 have dedicated, or nonprogrammable, functions. For example, in addition to the single programmable input device 212, the welding-type device 226 may include a "voltage" knob to control a welding output voltage of the power converter 214 and/or a "wire feed speed" knob to control a wire feed speed of the wire feeder 216. Other nonprogrammable input device(s) may be provided based on the type(s) of processes supported by the welding-type device 226.

Figure 3:
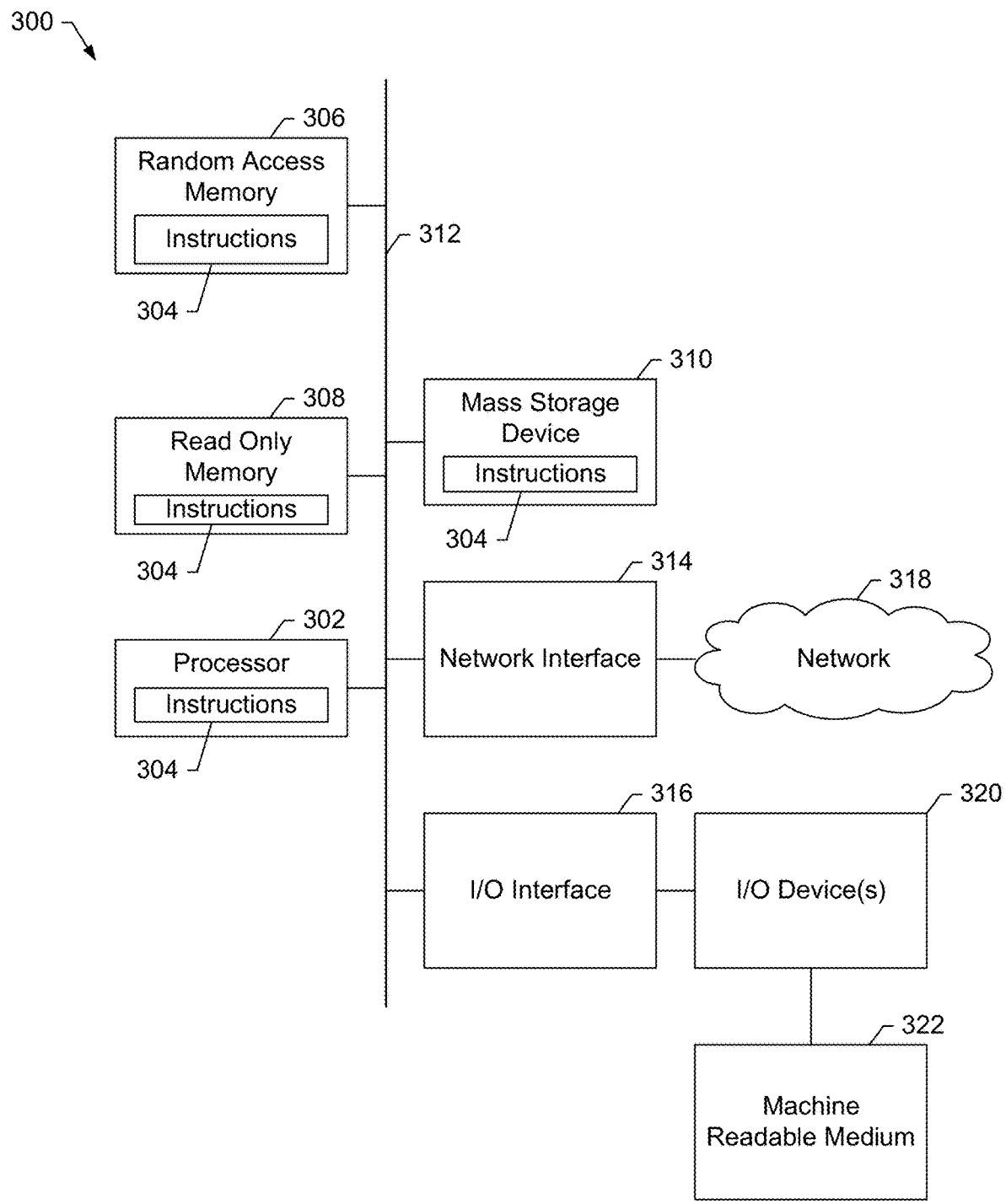
FIG. 3 is a block diagram of an example implementation of the interface configuration device of FIG. 1 to generate and send interpretation information to a welding-type device.

FIG. 3 is a block diagram of an example implementation of the interface configuration device 110 of FIG. 1 to generate and send interpretation information to a welding-type device (e.g., the welding-type power supplies 102-106, the welding accessory device 108 of FIG. 1). The example computing device 300 of FIG. 3 may be any type of system that uses a microcontroller or microprocessor to provide one or more features by executing software, firmware, and/or any other machine readable code. Example computing devices include laptop computers, tablet computers, smartphones, and/or any other type of computing device.

The example computing device 300 of FIG. 3 includes a processor 302. The example processor 302 may be any specialized or general-purpose microcontroller, such as a system-on-a-chip (SoC), graphics processing unit, and/or digital signal processor, from any manufacturer. The processor 302 executes machine readable instructions 304 that may be stored locally at the processor (e.g., in an included cache), in a random access memory 306 (or other volatile memory), in a read only memory 308 (or other non-volatile memory such as FLASH memory), and/or in a mass storage device 310. The example mass storage device 310 may be a hard drive, a solid state storage drive, a hybrid drive, a RAID array, and/or any other mass data storage device.

A bus 312 enables communications between the processor 302, the RAM 306, the ROM 308, the mass storage device 310, a network interface 314, and/or an input/output interface 316.

The example network interface 314 includes hardware, firmware, and/or software to connect the computing device 300 to a communications network 318 such as the Internet. For example, the network interface 314 may include IEEE 802.X-compliant wireless and/or wired communications hardware for transmitting and/or receiving communications.

The example I/O interface 316 of FIG. 3 includes hardware, firmware, and/or software to connect one or more input/output devices 320 to the processor 302 for providing input to the processor 302 and/or providing output from the processor 302. For example, the I/O interface 316 may include a graphics processing unit for interfacing with a display device, a universal serial bus port for interfacing with one or more USB-compliant devices, a FireWire, a field bus, and/or any other type of interface.

The I/O device(s) 320 may also include a keyboard, a keypad, a mouse, a trackball, a pointing device, a microphone, an audio speaker, an optical media drive, a multi-touch touch screen, a camera, a gesture recognition interface, a magnetic media drive, and/or any other type of input and/or output device.

The example computing device 300 may access a non-transitory machine readable medium 322 via the I/O interface 316 and/or the I/O device(s) 320. Examples of the machine readable medium 322 of FIG. 3 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Consistent with embedded systems, one or more of the processor 302, the random access memory 306, the read-only memory 308, the mass storage device 310, the bus 312, the network interface 314, and/or the I/O interface 316 may be implemented in a single package.

Figure 4A:
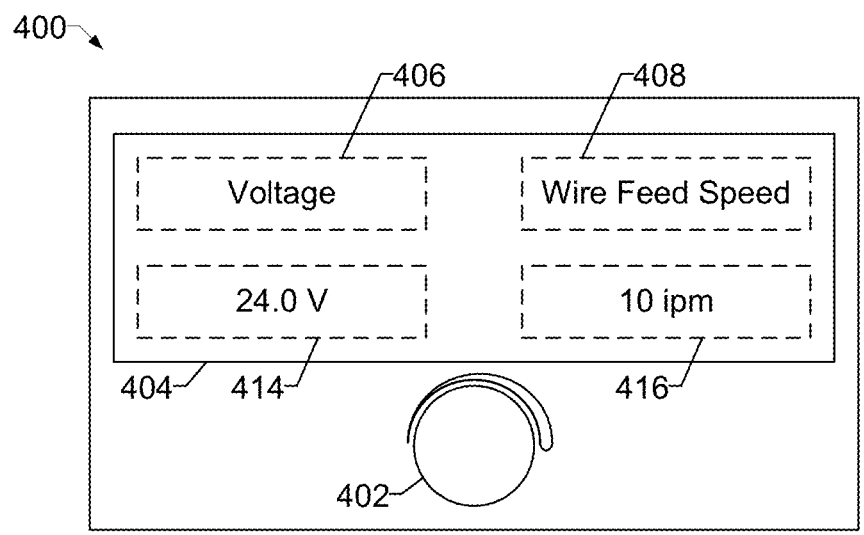
FIGS. 4A and 4B illustrate an example user interface device including one programmable interface knob, in accordance with aspects of this disclosure.
Figure 4B:
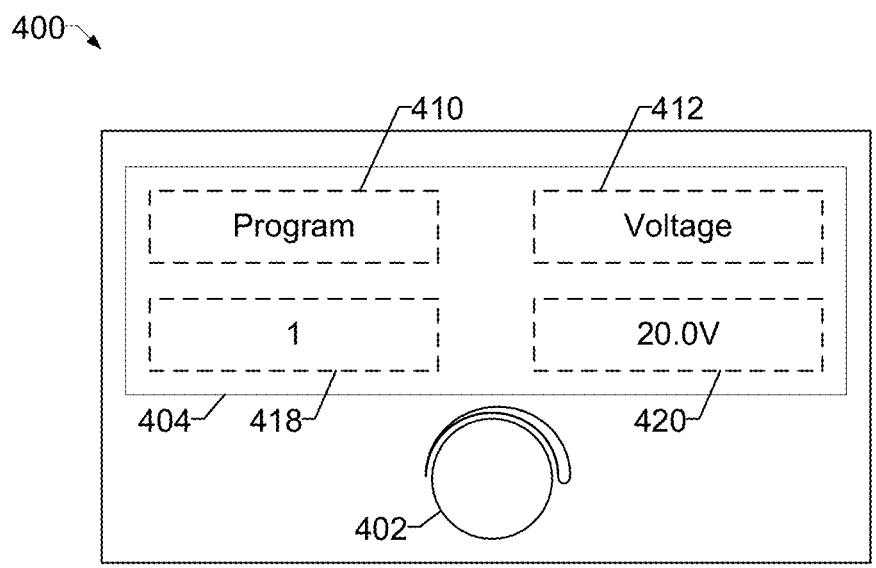

FIGS. 4A and 4B illustrate an example user interface 400 including one programmable interface knob 402. The user interface 400 may implement the user interfaces of any of the welding-type devices 102-108 of FIG. 1. The example user interface device 400 also includes a programmable display device 404, which displays welding-related variables 406, 408, 410, 412 (e.g., "Voltage," "Wire Feed Speed," and "Program") and values 414, 416, 418, 420 of the corresponding welding-related variables.

A weld engineer or other production control personnel in a fabrication shop may uses the interface configuration device 110 of FIG. 1 to configure the user interface 400. For example, the weld engineer may use an app to configure the programmable knob 402 as wire feed speed and program the programmable display device 404, and limits the range to 300 inches per minute (IPM), plus and/or minus 10 IPM (e.g., according to a welding specification for the customer or the part). The controller 208 implements the interpretation information provided by the app so that, as the programmable knob 402 is turned by operator, the controller 208 modifies the WFS variable in response to the programmable knob 402 and the programmable display device 404 shows the commanded WFS.

The example programmable interface knob 402 controls welding-related variables (or no welding-related variables) as specified in the interpretation information provided by the interface configuration device 110 of FIG. 1. Following the interface illustrated in FIG. 4A, in which input from the programmable interface knob 402 is interpreted by the controller 208 of FIG. 2A to modify voltage and wire feed speed variables, interpretation instructions may be provided to the welding-type device 200 to change the variables controlled via the programmable interface knob 402 to the program variable 410 (e.g., a welding program preset selection) and the voltage variable 412. The reconfiguration of the user interface 400 may occur without restarting the welding-type device and without performing a firmware update or other writing to non-volatile memory.

Figure 5A:
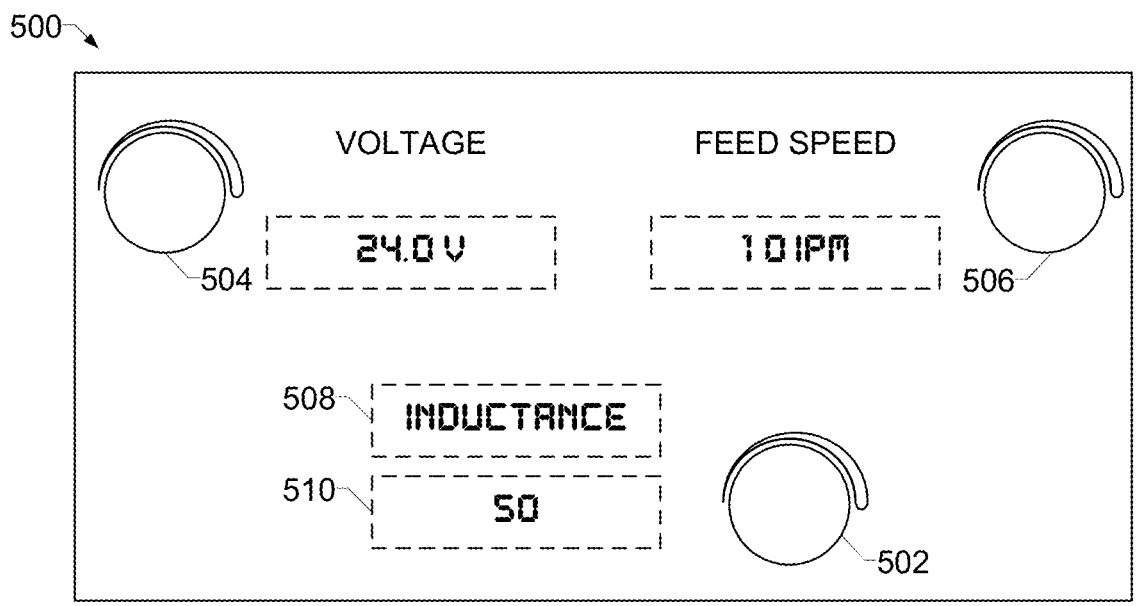
FIGS. 5A and 5B illustrate an example user interface including one programmable interface knob and two nonprogrammable interface knobs, in accordance with aspects of this disclosure.
Figure 5B:
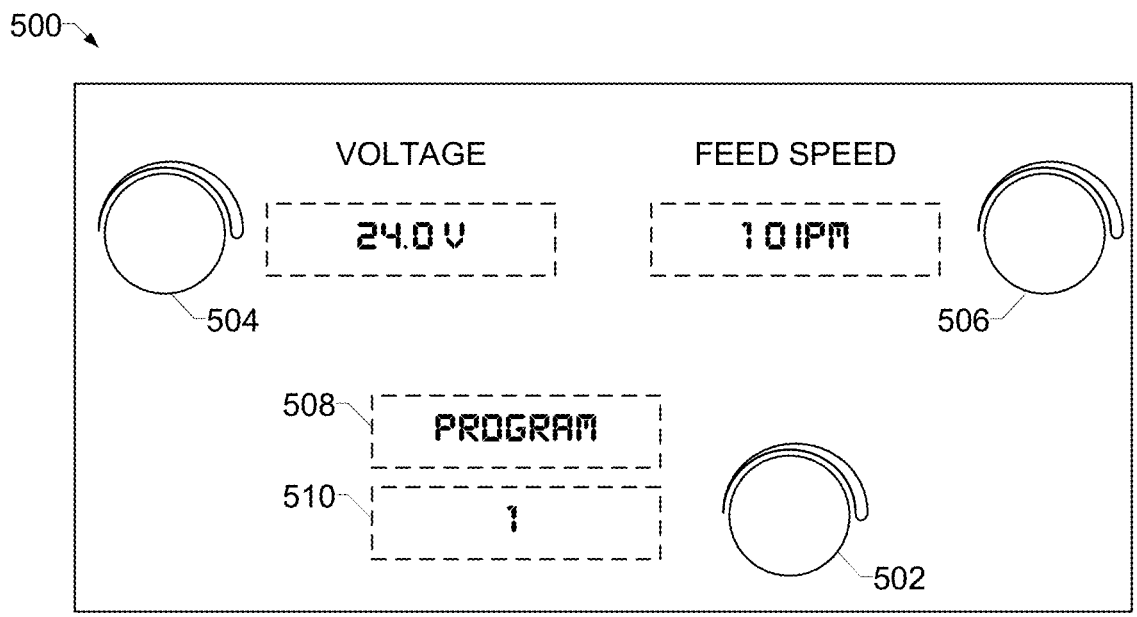

FIGS. 5A and 5B illustrate another example user interface 500, including one programmable knob 502 and two non-programmable knobs 504, 506. The example user interface 500 of FIGS. 5A and 5B may implement the user interfaces of any of the welding-type devices 102-108 of FIG. 1. While the programmable knob 502 is programmable to control any number of variables, the nonprogrammable knobs 504, 506 are dedicated to changing voltage and wire feed speed, respectively. The nonprogrammable knobs 504, 506 may be used to control one or more specified (e.g., predetermined) variables. While the example programmable knob 502 may be reprogrammed using newly-provided interpretation information during runtime of the welding-type device, as shown in FIG. 5B, the nonprogrammable knobs 504, 506 retain the same functions.

Example programmable output device(s) 508, 510 are configured via the interpretation information to indicate variable(s) being controlled by the programmable knob 502. The example programmable output device(s) 508, 510 are multi-segment LED displays. For example, in FIG. 5A the programmable output device 508 outputs "Inductance" to indicate to the user that the programmable knob 502 controls an inductance variable, and the programmable output device 510 outputs a current set value of the inductance variable. In FIG. 5B, the programmable output device 508 outputs "Program" to indicate to the user that the programmable knob 502 controls a program preset selection, and the programmable output device 510 outputs a current program number selection.

Figure 6:
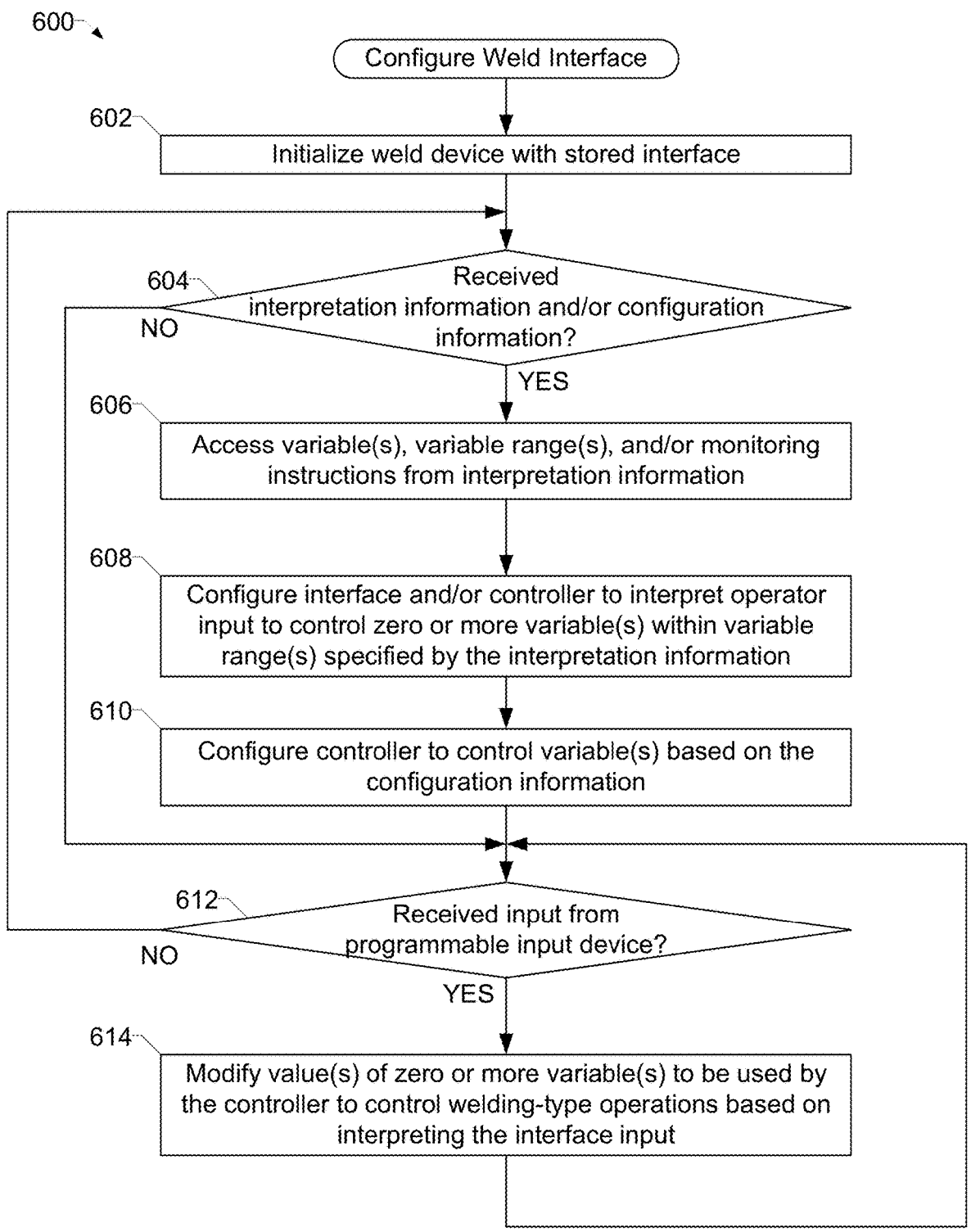
FIG. 6 is a flowchart representative of example machine readable instructions which may be executed to control a welding-type device using one programmable interface knob to control zero or more welding-type variables.

FIG. 6 is a flowchart representative of example machine readable instructions 600 which may be executed to control a welding-type device (e.g., the welding-type device 200, 222, 226) using one programmable interface knob to control zero or more welding-type variables. The example instructions 600 below are described with reference to the welding-type device 200 of FIG. 2A, but may be implemented using the example welding-type devices 222, 226 of FIGS. 2B, 2C of FIGS. 2B and/or 2C.

At block 602, the controller 208 initializes the welding-type device 200 with a stored interface. For example, the controller 208 may load a most recent interface and/or a default interface upon powering on of the welding-type device 200.

At block 604, the controller 208 determines whether interpretation information and/or configuration information has been received. For example, the interpretation information (e.g., information or instructions for controlling zero or more welding-type variables in response to input from the programmable input device 212) and/or the configuration information (e.g., information for controlling welding-type variables that are not controlled via the interpretation information) may be received via the communication interface 206.

If interpretation information and/or configuration information have been received (block 604), at block 606 the controller 208 accesses the variable(s), variable range(s), and/or monitoring instructions from the interpretation information. For example, the controller 208 may parse a markup file to identify variable(s) controlled via the programmable input device 212 and/or to identify information to be output via one or more programmable output device(s) (e.g., the programmable output device(s) 224 of FIG. 2). At block 608, the controller 208 configures interface device(s) and/or the controller 208 to interpret operator input to control zero or more variable(s) within variable range(s) specified by the interpretation information.

At block 610, the controller 208 configures the controller 208 to control variable(s) based on the configuration information. The configuration information may specify variables to be automatically controlled (e.g., not controlled via a programmable or non-programmable input device), a pulse program or advanced waveform to be executed, welding schedules for selection, and/or any other welding-type variable configuration data.

After configuring the controller 208 (block 610), or if interpretation information and/or configuration information have not been received (block 604), at block 612, the controller 208 determines whether input has been received from the programmable input device 212. If input has not been received from the programmable input device 212 (block 612), control returns to block 604.

When input is received from the programmable input device 212 (block 612), at block 614 the controller 208 modifies value(s) of zero or more variable(s) to be used by the controller 208 to control welding-type operations based on interpreting the interface input. For example, if the interpretation information specifies that the programmable input device 212 is to control voltage and wire feed speed, the controller 208 responds to input via the programmable input device 212 by change the voltage and wire feed speed values for controlling welding-type operations.

Figure 7:
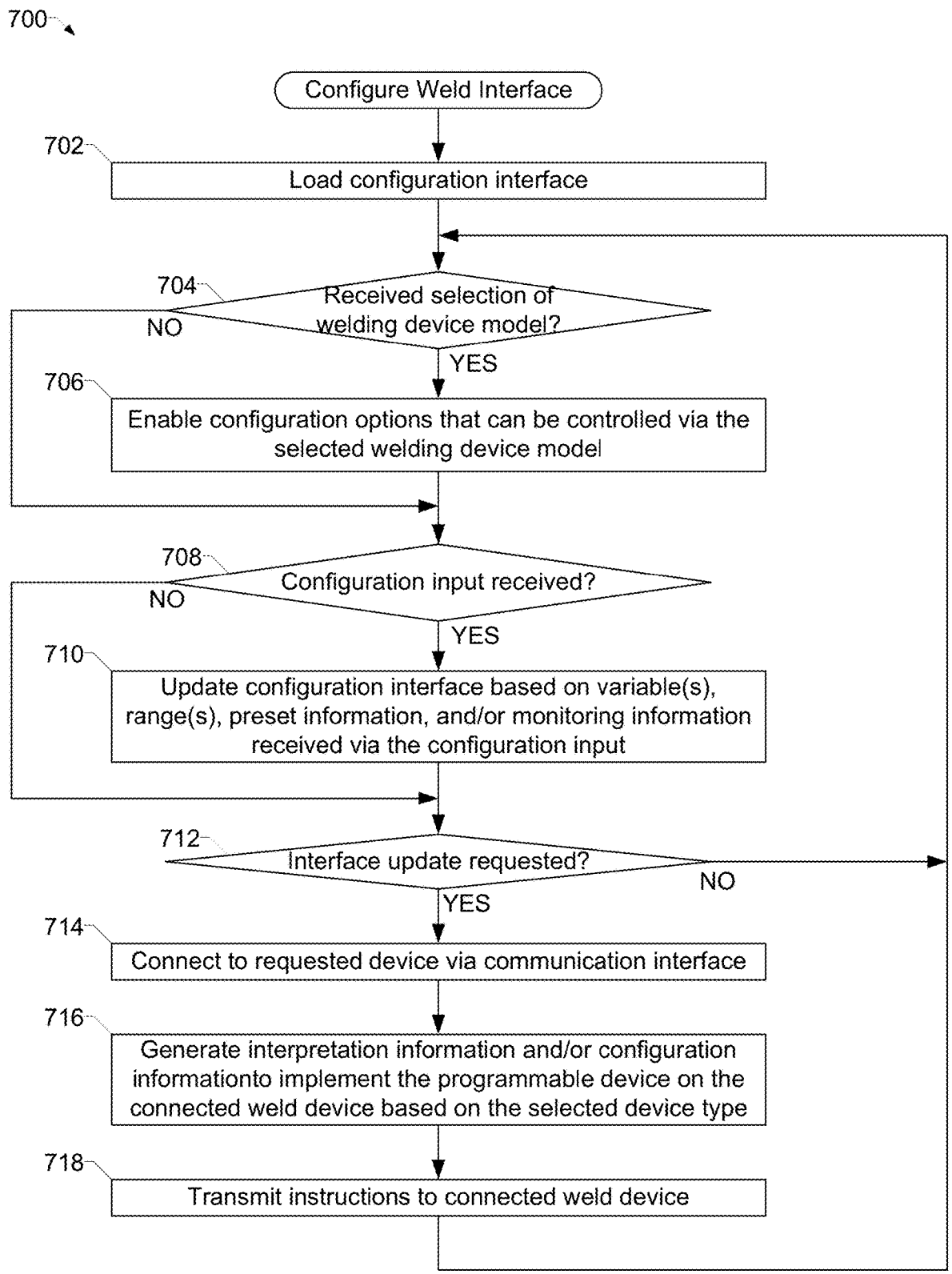
FIG. 7 is a flowchart representative of example machine readable instructions which may be executed to control a welding-type device using one programmable interface knob to control zero or more welding-type variables.

FIG. 7 is a flowchart representative of example machine readable instructions 700 which may be executed to control a welding-type device using one programmable interface knob to control zero or more welding-type variables. The example instructions 700 below are described with reference to the computing device 300 of FIG. 3.

At block 702, the processor 302 loads a configuration interface. The configuration interface may include tools to generate interpretation information and/or configuration information. For example, the configuration interface may include a list of controllable variables, a list of programmable input and/or programmable output devices, and/or a mechanism to assign variables to the programmable input and/or programmable output devices.

At block 704, the processor 302 determines whether a selection of a welding device model has been received. For example, the configuration interface may present a list of welding device models, and tailor the lists of controllable variables and/or the lists of programmable input and/or programmable output devices based on the selected welding device model to reduce or eliminate the chance of incompatible interpretation information and/or configuration information being provided to a welding-type device. If a selection of a welding device model has been received (block 704), at block 706 the processor 302 enables configuration options that can be controlled via the selected welding device model. Conversely, the processor 302 may disable configuration options that are not controllable via the selected welding device model.

After enabling configuration options (block 706), or if a selection of a welding device model has not been received (block 704), at block 708 the processor 302 determines whether configuration input has been received. If configuration input has been received (block 708), at block 710 the processor 302 updates the configuration interface based on variable(s), range(s), preset information, and/or monitoring information received via the configuration input.

After updating the configuration interface (block 710), or if configuration input has not been received (block 708), at block 712 the processor 302 determines if an interface update is requested. For example, the processor 302 may determine if a user of the computing device 300 has requested that a welding-type device be configured or programmed (e.g., to interpret a single programmable input device). Additionally or alternatively, the processor 302 may identify a handshake or other indicator that a connection to a welding-type device is being requested. Examples include identifying a near field communication, RFID, or other close-proximity device in communication with the computing device 300 via the network interface 314 and/or the I/O interface 316.

If an interface update has been requested (block 712), at block 714 the processor 302 connects to the requested device via a communication interface such as the network interface 314 and/or the I/O interface 316 of FIG. 3. At block 716, the processor 302 generates interpretation information and/or configuration information to implement the programmable input device on the connected welding-type device based on the selected device type. For example, the processor 302 may generate a markup file or other data file for transfer to the welding-type device, where the markup file (or other data file) is structured or formatted based on the type (e.g., model) of the welding-type device receiving the file. The generated interpretation information instructs the controller or processor of the welding-type device to modify zero or more welding-type variables in response to input from the programmable input device and/or to output information via one or more programmable output devices. The generated configuration information instructs the controller or processor of the welding-type device to control welding-type variables that are not controlled by the programmable input device nor by any nonprogrammable input devices.

At block 718, the processor 302 transmits the interpretation information and/or the configuration information to the connected welding-type device (e.g., via the network interface 314 and/or the I/O interface 316). After transmitting the instructions (block 718), or if an interface update is not requested (block 712), control returns to block 704.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type device, comprising:
   only one user interface input device configured to receive an input to modify one or more welding variables of a plurality of welding variables;
   a receiver circuit configured to:
   receive interpretation information corresponding to a first welding variable or a second welding variable of the plurality of welding variables; and
   receive configuration information to provide values or ranges of values for the first or second welding variables of the plurality of welding variables that do not correspond to the interpretation information; and
   a controller configured to:
   interpret the input received via the user interface input device based on the interpretation information to modify zero or more of the plurality of welding variables, wherein the input corresponds to a first change in the first welding variable when the interpretation information corresponds to the first welding variable, and the input corresponds to a second change in the second welding variable when the interpretation information corresponds to the second welding variable;
   apply a limit specified in the configuration information to at least one of the first or second welding variables that is controlled by the user interface input device based on the interpretation information;
   control the first or second welding variables based on the configuration information; and
   control a welding operation based on the first change or the second change.

2. The welding-type device as defined in claim 1, further comprising an output device, the controller configured to output information via the output device to provide a visual response to the input received via the user interface input device.

3. The welding-type device as defined in claim 2, wherein the output device comprises a display device.

4. The welding-type device as defined in claim 1, wherein the controller is configured to:
   interpret the input received via the user interface input device based on the interpretation information to modify the first welding variable; and
   modify the second welding variable based on the modification of the first welding variable.

5. The welding-type device as defined in claim 1, wherein the controller is configured to interpret the input received via the user interface input device to simultaneously modify two or more of the welding variables based on the interpretation information.

6. The welding-type device as defined in claim 1, wherein the first welding variable received with the interpretation information corresponds to a weld voltage, and the second welding variable received with the interpretation information corresponds to a wire feed speed, and the controller is configured to control a power converter for a gas metal arc welding (GMAW) welding process.

7. The welding-type device as defined in claim 1, wherein the receiver circuit is configured to receive the interpretation information via a wireless communication.

8. The welding-type device of claim 1, wherein the user interface input device is a turnable knob physically located on the welding device.

9. A welding-type device, comprising:
   only one configurable user interface input device;
   one or more nonconfigurable user interface input devices;
   a receiver circuit configured to:
   receive interpretation information corresponding to a first welding variable or a second welding variable of a plurality of welding variables for the configurable user interface input device; and
   receive configuration information to provide values or ranges of values for the first or second welding variables of the plurality of welding variables that do not correspond to the interpretation information; and
   a controller configured to:
   assign control of the first or second welding variables of the plurality of welding variables to the configurable user interface input device;
   interpret a first input received via the configurable user interface input device based on the interpretation information to modify zero or more of the first or second welding variables of the plurality of welding variables assigned to the configurable user interface input device, wherein the input corresponds to a first change in the first welding variable when the interpretation information corresponds to the first welding variable, and the input corresponds to a second change in the second welding variable when the interpretation information corresponds to the second welding variable;
   interpret a second input received via the one or more nonconfigurable user interface input devices to modify a predetermined one or more of the plurality of welding variables;
   apply a limit specified in the configuration information to at least one of the first or second welding variables that is controlled by the user interface input device based on the interpretation information;
   control the first or second welding variables based on the configuration information; and
   control output of welding power based on the plurality of welding variables.

10. The welding-type device as defined in claim 9, further comprising an output device, the controller configured to output information via the output device to provide a visual response to the first input received via the configurable user interface input device.

11. The welding-type device as defined in claim 10, wherein the output device comprises a display device.

12. The welding-type device as defined in claim 10, wherein the controller is configured to output, via the output device and based on the interpretation information, a value of the first or second welding variables that is controlled by the configurable user interface input device.

13. The welding-type device as defined in claim 9, wherein the controller is configured to interpret the first input received via the configurable user interface input device to simultaneously modify two of the-welding variables based on the interpretation information.

14. The welding-type device as defined in claim 9, wherein the receiver circuit is configured to receive the interpretation information via a wireless communication.

15. The welding-type device as defined in claim 9, wherein the configuration information specifies control information for at least one of the first or second welding variables that is not controlled by the configurable user interface input device as specified by the interpretation information and is not controlled by the one or more nonconfigurable user interface input devices.

\* \* \* \* \*